US008004172B2

(12) United States Patent
Hussell et al.

(10) Patent No.: US 8,004,172 B2
(45) Date of Patent: Aug. 23, 2011

(54) SEMICONDUCTOR LIGHT EMITTING APPARATUS INCLUDING ELONGATED HOLLOW WAVELENGTH CONVERSION TUBES AND METHODS OF ASSEMBLING SAME

(75) Inventors: Christopher P. Hussell, Cary, NC (US); John Adam Edmond, Durham, NC (US)

(73) Assignee: Cree, Inc., Durham, NC (US)

( * ) Notice: Subject to any disclaimer, the term of this patent is extended or adjusted under 35 U.S.C. 154(b) by 162 days.

(21) Appl. No.: 12/273,216

(22) Filed: Nov. 18, 2008

(65) Prior Publication Data

US 2010/0124243 A1 May 20, 2010

(51) Int. Cl.
*H01J 1/62* (2006.01)
(52) U.S. Cl. ............ 313/488; 313/495; 257/99; 257/100
(58) Field of Classification Search ................ 257/99, 257/100; 362/178; 313/488, 495
See application file for complete search history.

(56) References Cited

U.S. PATENT DOCUMENTS

| | | | |
|---|---|---|---|
| 5,998,925 A | 12/1999 | Shimizu et al. | |
| 6,350,041 B1 | 2/2002 | Tarsa et al. | |
| 6,853,010 B2 | 2/2005 | Slater, Jr. et al. | |
| 6,967,116 B2 | 11/2005 | Negley | |
| 6,994,453 B2 | 2/2006 | Blanchard | |
| 7,029,935 B2 | 4/2006 | Negley et al. | |
| 7,042,020 B2 | 5/2006 | Negley | |
| 7,183,587 B2 | 2/2007 | Negley et al. | |
| 7,217,583 B2 | 5/2007 | Negley et al. | |
| 7,345,320 B2 * | 3/2008 | Dahm | 257/99 |
| D566,057 S | 4/2008 | Edmond et al. | |
| 7,355,284 B2 | 4/2008 | Negley | |
| 7,372,198 B2 | 5/2008 | Negley | |
| D582,866 S | 12/2008 | Edmond et al. | |
| 2002/0047516 A1 | 4/2002 | Iwasa et al. | |
| 2003/0230756 A1* | 12/2003 | Prees | 257/98 |
| 2004/0080938 A1* | 4/2004 | Holman et al. | 362/231 |
| 2005/0242711 A1 | 11/2005 | Bloomfield | |
| 2006/0097385 A1 | 5/2006 | Negley | |

(Continued)

FOREIGN PATENT DOCUMENTS

DE 10 2006 061 164 A1 6/2008

(Continued)

OTHER PUBLICATIONS

Kim et al. "Strongly Enhanced Phosphor Efficiency in GaInN White Light-Emitting Diodes Using Remote Phosphor Configuration and Diffuse Reflector Cup" *Japanese Journal of Applied Physics* 44(21):L649-L651 (2005).

(Continued)

*Primary Examiner* — Eugene Lee
*Assistant Examiner* — Anthony Ho
(74) *Attorney, Agent, or Firm* — Myers Bigel Sibley & Sajovec, PA

(57) ABSTRACT

A semiconductor light emitting apparatus includes an elongated hollow wavelength conversion tube that includes an elongated wavelength conversion tube wall having wavelength conversion material, such as phosphor, dispersed therein. A semiconductor light emitting device is oriented to emit light inside the elongated hollow wavelength conversion tube to impinge upon the elongated wavelength conversion tube wall and the wavelength conversion material dispersed therein. The elongated hollow wavelength conversion tube may have an open end, a crimped end, a reflective end, and/or other configurations. Multiples tubes and/or multiple semiconductor light emitting devices may also be used in various configurations. Related assembling methods are also described.

31 Claims, 8 Drawing Sheets

U.S. PATENT DOCUMENTS

| | | |
|---|---|---|
| 2007/0263405 A1 | 11/2007 | Ng et al. |
| 2008/0054281 A1 | 3/2008 | Narendran et al. |
| 2008/0099770 A1 | 5/2008 | Mendendorp et al. |
| 2008/0135860 A1 | 6/2008 | Setlur et al. |
| 2008/0149959 A1 | 6/2008 | Nakamura et al. |
| 2008/0173884 A1 | 7/2008 | Chitnis et al. |
| 2008/0179611 A1 | 7/2008 | Chitnis et al. |
| 2008/0198572 A1 | 8/2008 | Medendorp |
| 2008/0310158 A1 | 12/2008 | Harbers et al. |

FOREIGN PATENT DOCUMENTS

| | | |
|---|---|---|
| JP | 2006-40850 A | 2/2006 |
| WO | WO 2004/100213 A2 | 11/2004 |
| WO | WO 2006/059535 A2 | 6/2006 |
| WO | WO 2008/060335 A1 | 5/2008 |
| WO | WO 2008/078161 A1 | 7/2008 |
| WO | WO 2008/134056 A1 | 11/2008 |

OTHER PUBLICATIONS

International Search Report and Written Opinion, PCT International Application No. PCT/US2009/063804, Feb. 26, 2010.

Cree, Inc., Data Sheet CPR3CR, Rev. A, *Cree® EZ1000™ LEDs Data Sheet CxxxEZ1000-Sxx000*, 2006, 6 pp.

Dow Corning, Product Information—"Information About Dow Corning® Brand LED Materials", 2006, 6 pp.

Dow Corning, Electronic Solutions—"Dow Corning LED Solutions Lighting the way to advance materials and solutions", 2008, 4 pp.

Loctite, Technical Data Sheet—HYSOL® OS4000 L.E.D. Casting System, no copyright date, 2 pp.

International Preliminary Report on Patentability corresponding to International Application No. PCT/US2009/063804; Date of Mailing Mar. 9, 2011; 8 pages.

\* cited by examiner

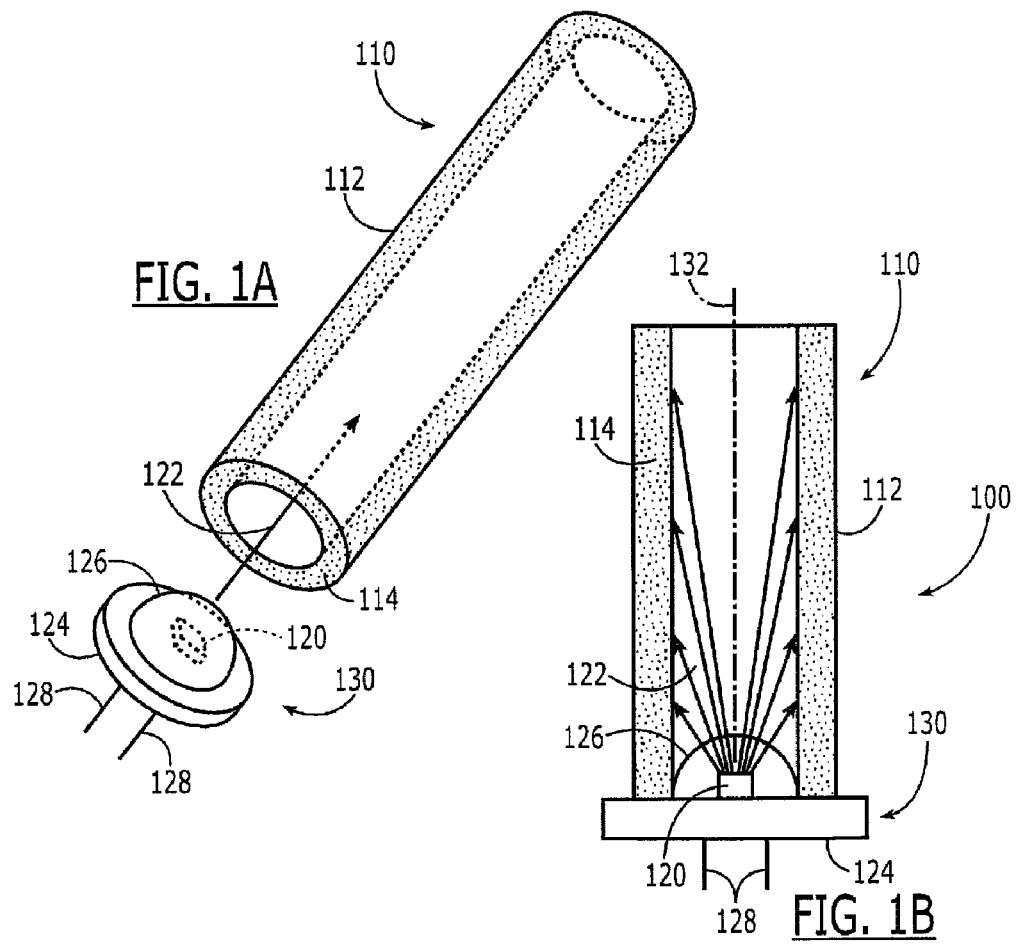
FIG. 1A
FIG. 1B
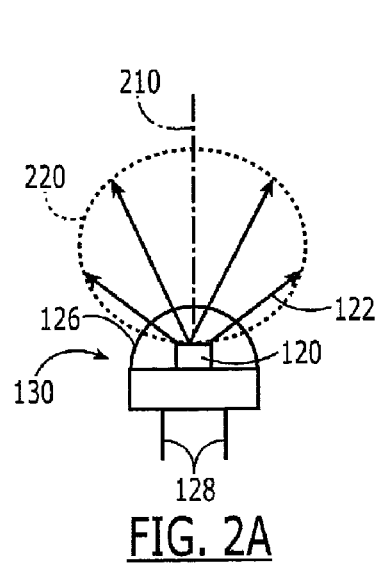
FIG. 2A
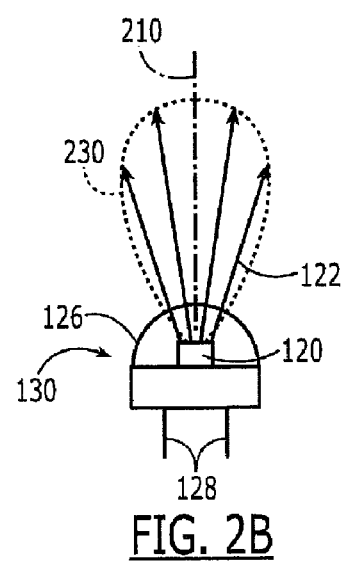
FIG. 2B

US 8,004,172 B2

SEMICONDUCTOR LIGHT EMITTING APPARATUS INCLUDING ELONGATED HOLLOW WAVELENGTH CONVERSION TUBES AND METHODS OF ASSEMBLING SAME

BACKGROUND OF THE INVENTION

This invention relates to light emitting apparatus and methods of assembling and operating same, and more particularly to semiconductor light emitting apparatus and methods of assembling and operating same.

Semiconductor light emitting devices ("LEDs"), such as light emitting diodes and laser diodes, are widely known solid-state lighting elements that are capable of generating light upon application of voltage thereto. Light emitting devices generally include a p-n junction, an anode ohmic contact for the p-type region of the device, and a cathode ohmic contact for the n-type region of the device. The device may be formed on a substrate, such as a sapphire, silicon, silicon carbide, gallium arsenide, gallium nitride, etc., substrate, or the device may not include a substrate. The semiconductor p-n junction may be fabricated, for example, from silicon carbide, gallium nitride, gallium phosphide, aluminum nitride and/or gallium arsenide-based materials and/or from organic semiconductor-based materials.

Semiconductor LEDs may be used in lighting/illumination applications, for example, as a replacement for conventional incandescent and/or fluorescent lighting. As such, it is often desirable to provide a lighting source that generates white light having a relatively high color rendering index (CRI), so that objects illuminated by the lighting may appear more natural. The color rendering index of a light source is an objective measure of the ability of the light generated by the source to accurately illuminate a broad range of colors. The color rendering index ranges from essentially zero for monochromatic sources to nearly 100 for incandescent sources.

In addition, the chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature at which the heated black-body radiator matches the color or hue of the white light source. White light typically has a CCT of between about 4000 and 8000K. White light with a CCT of 4000 has a yellowish color. White light with a CCT of 8000K is more bluish in color, and may be referred to as "cool white". "Warm white" may be used to describe white light with a CCT of between about 2600K and 3500K, which is more reddish in color.

In order to produce white light, multiple LEDs emitting light of different colors of light may be used. The light emitted by the LEDs may be combined to produce a desired intensity and/or color of white light. For example, when red-, green- and blue-emitting LEDs are energized simultaneously, the resulting combined light may appear white, or nearly white, depending on the relative intensities of the component red, green and blue sources. However, in LED lamps including red, green, and blue LEDs, the spectral power distributions of the component LEDs may be relatively narrow (e.g. about 10-30 nm lull width at half maximum (FWHM)). While it may be possible to achieve fairly high luminous efficacy and/or color rendering with such lamps, wavelength ranges may exist in which it may be difficult to obtain high efficiency (e.g., approximately 550 nm).

Alternatively, the light from a single-color LED may be converted to white light by surrounding the LED with a wavelength conversion material, such as phosphor particles. The term "wavelength conversion material" is used herein to refer to any material that absorbs light at one wavelength and re-emits light at a different wavelength, regardless of the delay between absorption and re-emission and regardless of the wavelengths involved. Accordingly, the term "wavelength conversion material" may be used herein to refer to materials that are sometimes called fluorescent and/or phosphorescent and often referred to as "phosphors". In general, phosphors absorb light having shorter wavelengths and re-emit light having longer wavelengths. As such, some or all of the light emitted by the LED at a first wavelength may be absorbed by the phosphor particles, which may responsively emit light at a second wavelength. For example, a blue emitting LED may be surrounded by a yellow phosphor, such as cerium-doped yttrium aluminum garnet (YAG). The resulting light, which is a combination of blue light and yellow light, may appear white to an observer.

Accordingly, efforts have been made to integrate a semiconductor light emitting device with wavelength conversion material to provide a semiconductor light emitting apparatus. The wavelength conversion material may be coated on the LED itself, may be provided in a drop of material between the semiconductor LED and the dome of an LED (also referred to as a shell or lens) and/or may be provided remote from the semiconductor LED by providing wavelength conversion material inside, outside and/or within the dome of an LED and/or on/within another surface remote from the LED.

SUMMARY OF THE INVENTION

Semiconductor light emitting apparatus according to various embodiments of the present invention include an elongated hollow wavelength conversion tube that comprises an elongated wavelength conversion tube wall having wavelength conversion material such as phosphor dispersed therein uniformly or non-uniformly. The tube need not be cylindrical. A semiconductor light emitting device is oriented to emit light inside the elongated hollow wavelength conversion tube to impinge upon the elongated wavelength conversion tube wall and the wavelength conversion material dispersed therein.

In some embodiments, the semiconductor light emitting device is oriented such that at least 20% of the emitted light strikes the elongated hollow wavelength conversion tube wall at an oblique angle. In other embodiments, the semiconductor light emitting device is oriented such that at least about 90% of the emitted light strikes the elongated hollow wavelength conversion tube at an oblique angle. In some embodiments, the semiconductor light emitting device is confined to emit light in a Lambertian pattern about an emission axis. In other embodiments, the semiconductor light emitting device is configured to emit light in a non-Lambertian pattern, such as a focused pattern.

Various other embodiments of the invention can provide an elongated hollow wavelength conversion tube that is oriented relative to the semiconductor light emitting device, so as to provide a longer path length through the elongated wavelength conversion tube wall for light that is emitted by the semiconductor light emitting device that does not strike the wavelength conversion material embedded therein without increasing the path length of light that is converted by striking the wavelength conversion material embedded therein. In some embodiments, the semiconductor light emitting device is a blue light emitting diode having an area of about 1 mm$^2$, and the apparatus produces about 160 lumens per watt at a color temperature of about 4700K. In other embodiments, the apparatus produces about 150 lumens per watt at a color temperature of about 5500K.

The elongated hollow wavelength conversion tube may itself have various configurations according to various embodiments. In some embodiments, the elongated hollow wavelength conversion tube includes inner and outer surfaces, and a supporting layer is provided on the inner surface and/or on the outer surface. In other embodiments, the inner and/or outer surfaces are textured uniformly or non-uniformly. In some embodiments, the tube wall defines a tube axis, and the semiconductor light emitting device is configured to emit light symmetrically about an emission axis. The semiconductor light emitting device is oriented such that the emission axis is coincident with the tube axis.

Various other configurations of elongated hollow wavelength conversion tubes may be provided. For example, in some embodiments, the elongated hollow wavelength conversion tube includes first and second opposing ends, and the semiconductor light emitting device is adjacent the first end. In some embodiments, the second end is a closed end, whereas in other embodiments the second end is a crimped second end. In still other embodiments, a cap is provided at the second end, and in yet other embodiments, the cap may comprise a wavelength conversion material and/or a reflective material.

In still other embodiments, multiple semiconductor light emitting devices may be provided. For example, in some embodiments, a second semiconductor light emitting device is provided adjacent the second end that is oriented to emit light inside the elongated hollow wavelength conversion tube. In some of these embodiments, a double-sided reflector may be provided in the elongated hollow wavelength conversion tube between the first and second semiconductor light emitting devices. In other embodiments, the elongated hollow wavelength conversion tube may be crimped between the first and second semiconductor light emitting devices.

In still other embodiments, the semiconductor light emitting device extends at least partially into the elongated hollow wavelength conversion tube. In some of these embodiments, the semiconductor light emitting device extends partially into the wavelength conversion tube to emit light towards a first end thereof. In still other embodiments, a second semiconductor light emitting device may extend at least partially into the elongated hollow wavelength conversion tube to emit light towards a second end thereof. In yet other embodiments, the first and second semiconductor light emitting devices may be oriented in back-to-back relation within the elongated hollow wavelength conversion tube. In still other embodiments, a screw-type base may be provided as well as a pair of standoffs that maintain the elongated hollow wavelength conversion tube and the first and second semiconductor light emitting devices spaced apart from the screw-type base. A bulb may also be provided that is connected to the screw-type base and surrounds the hollow wavelength conversion tube and the first and second semiconductor light emitting devices.

Apparatus according to various embodiments of the present invention may also include a mounting substrate and a dome on the mounting substrate, with the semiconductor light emitting device being located between the mounting substrate and the dome. The dome may extend at least partially into an end of the elongated hollow wavelength conversion tube, and the mounting substrate may extend at least partially outside the elongated hollow wavelength conversion tube.

Multi-tube embodiments also may be provided. For example, in some embodiments, the apparatus further comprises a second elongated hollow wavelength conversion tube, and the first and second elongated hollow wavelength conversion tube share a common end. The semiconductor light emitting device is adjacent the common end. In other embodiments, a plurality of elongated hollow wavelength conversion tubes may share the common end and extend around a central axis. In yet other embodiments, a second elongated hollow wavelength conversion tube is provided that is coaxial to a first elongated hollow wavelength conversion tube.

Semiconductor light emitting apparatus according to still other embodiments of the present invention may comprise a plurality of light emitting filaments. A respective light emitting filament comprises an elongated hollow wavelength conversion tube that includes an elongated wavelength conversion tube wall having wavelength conversion material dispersed therein, and a semiconductor light emitting device that is oriented to emit light inside the elongated hollow wavelength conversion tube. The plurality of light emitting filaments may be oriented end-to-end in a linear array, in some embodiments. In other embodiments, the plurality of light emitting filaments may extend about a common origin in a three-dimensional array. The elongated hollow wavelength conversion tube(s) and the semiconductor light emitting device(s) may be provided according to any of the embodiments described herein.

Methods of assembling semiconductor light emitting apparatus may also be provided. In these methods, a dome that surrounds a semiconductor light emitting device that is on a substrate is inserted at least partially into an end of an elongated hollow wavelength conversion tube having wavelength conversion material dispersed therein. The elongated hollow wavelength conversion tube may be crimped remote from the end. The semiconductor light emitting device and the elongated hollow wavelength conversion tube may be configured according to any of the embodiments described herein.

BRIEF DESCRIPTION OF THE DRAWINGS

FIG. 1A a perspective view of a semiconductor light emitting apparatus according to various embodiments.

FIG. 1B is a cross-sectional view of a semiconductor light emitting apparatus according to other embodiments.

FIGS. 2A and 2B are cross-sectional views of packaged semiconductor light emitting devices.

DETAILED DESCRIPTION

Figure 3:
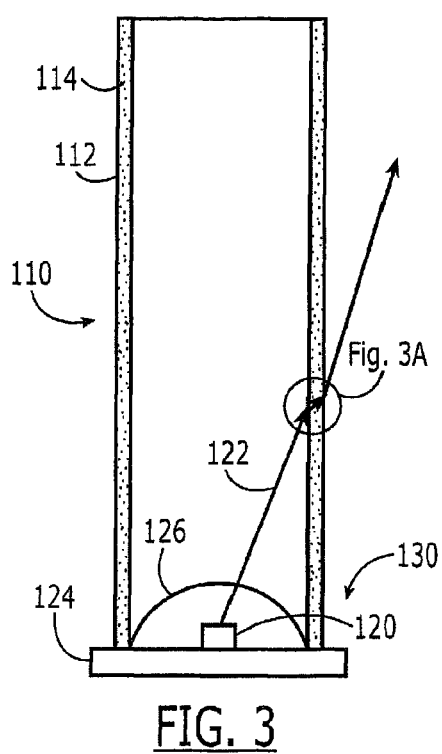
FIGS. 3-10 are cross-sectional views of semiconductor light emitting apparatus according to various other embodiments.

The present invention now will be described more fully with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

It will be understood that when an element such as a layer, region or substrate is referred to as being "on" another element, it can be directly on the other element or intervening elements may also be present. Furthermore, relative terms such as "beneath" or "overlies" may be used herein to describe a relationship of one layer or region to another layer or region relative to a substrate or base layer as illustrated in the figures. It will be understood that these terms are intended to encompass different orientations of the device in addition to the orientation depicted in the figures. Finally, the term "directly" means that there are no intervening elements. As used herein, the term "and/or" includes any and all combinations of one or more of the associated listed items and may be abbreviated as "/".

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the invention are described herein with reference to cross-sectional and/or other illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as a rectangle will, typically, have rounded or curved features due to normal manufacturing tolerances. Thus, the regions illustrated in the figures are schematic in nature and their shapes are not intended to illustrate the precise shape of a region of a device and are not intended to limit the scope of the invention, unless otherwise defined herein.

Unless otherwise defined herein, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIGS. 1A and 1B are a perspective view and a cross-sectional view of semiconductor light emitting apparatus according to various embodiments of the present invention. As shown in FIGS. 1A and 1B, these semiconductor light emitting apparatus include an elongated hollow wavelength conversion tube 110 that comprises an elongated wavelength conversion tube wall 112 having wavelength conversion material 114 uniformly or non-uniformly dispersed therein. As used herein, a tube denotes a long hollow object that may be, but need not be, cylindrical. Accordingly, the tube may be circular, elliptical, ellipsoidal and/or polygonal. A semiconductor light emitting device 120 is oriented to emit light 122 inside the elongated hollow wavelength conversion tube 110 to impinge upon the elongated wavelength conversion tube wall 112 and the wavelength conversion material 114 dispersed therein. In some embodiments, the semiconductor light emitting device 120 may be a packaged light emitting diode 130 that includes a mounting substrate 124 and a dome 126 on the mounting substrate 124, wherein the semiconductor light emitting device 120 is located between the mounting substrate 124 and the dome 126. One or more electrical leads 128 may extend from the mounting substrate 124. As also shown in FIGS. 1A and 1B, the tube wall 112 defines a tube axis 132, and the semiconductor light emitting device 120 is configured to emit light 122 generally symmetrically about an emission axis and is oriented such that the emission axis is generally coincident with the tube axis 132.

Various configurations of the semiconductor light emitting device 120, the mounting substrate 124 and the dome 126 may be provided according to various embodiments of the present invention. In some embodiments, the packaged semiconductor light emitting device 130 may be represented by a commercially available LED, such as a Cree® EZ1000™ LED, manufactured by the assignee of the present invention, and described in the Data Sheet CPR3CR, Rev. A, entitled Cree®EZ1000™ LEDs Data Sheet CxxxEZ1000-Sxx000, copyright 2006, Cree, Inc., available on the Web at cree.com. As indicated in this data sheet, these LEDs may use a single semiconductor die of size 980/980 µm² or about 1 mm². These LEDs may operate at a voltage of about 3 V (more typically about 3.3 V), and a current of about 350 mA (current density of about 35 A/cm²) for an input power of about 1 watt. The Cree EZ1000 LED may be manufactured under one or more of the following U.S. patents/applications, the disclosures of which are hereby incorporated herein in their entirety as if set forth fully herein: U.S. Pat. No. D566,057, issued Apr. 8, 2008, entitled LED Chip; U.S. Application Publication No. 2008/0173884, published Jul. 24, 2008, entitled Wafer Level Phosphor Coating Method and Devices Fabricated Utilizing Same; U.S. Application Publication No. 2008/0179611, published Jul. 31, 2008, entitled Wafer Level Phosphor Coating Method and Devices Fabricated Utilizing Same; and U.S. Application No. 29/284,431, filed Sep. 7, 2007, entitled LED Chip. However, other commercially available packaged LEDs or bare LED dice may be used.

The EZ1000 LED may be provided on a silver (Ag) header and encapsulated with a dome comprising, for example, Hysol® OS4000 fast curing water-white epoxy casting compound, marketed by Loctite. However, in other embodiments, other materials, such as epoxy, silicone and/or other transparent encapsulants may also be used. Moreover, the LED need not have a dome, so that a bare die or a domeless LED also may be used. In some embodiments, as shown in FIG. 1A, the semiconductor light emitting device 120 may be adjacent but not within the elongated hollow wavelength conversion tube 110. In other embodiments, as shown in FIG. 1B, the semiconductor light emitting device 120 may be at least partially within the elongated hollow wavelength conversion tube 110. In still other embodiments, the transparent dome 126 may be entirely within the elongated hollow wavelength conversion tube 110, whereas the mounting substrate 124 may be entirely outside and up against an end of the elongated hollow wavelength conversion tube.

In fact, FIGS. 1A and 1B also illustrate methods of assembling a semiconductor light emitting apparatus according to some embodiments, wherein a dome 126 that surrounds a semiconductor light emitting device 120 that is on a substrate 124 is inserted at least partially into an end of an elongated hollow wavelength conversion tube 110 having wavelength conversion material 114 dispersed therein. The dome may be press-fit inside the tube or an adhesive or other attaching element may be used.

The elongated hollow wavelength conversion tube 110 may be constructed from a sheet of plastic, epoxy, silicone and/or other transparent or translucent material, such as the aforementioned OS4000 material, that contains phosphor dispersed therein. The material may be mixed with phosphor at a desired concentration and then formed into a sheet, which is allowed to cure. The sheet may be rolled and glued into a tube and cut to a desired length. Alternatively, straws of plastic material including phosphor encapsulated therein may be provided and cut to size. Moreover, the hollow wavelength conversion tube 110 may be molded, extruded and/or formed by other conventional processes. The phosphor may be conventional YAG phosphor, conventional (Ca, Si, Ba) $SiO_4$: $Eu^{2+}$ (BOSE) phosphor and/or other conventional phosphors that may vary in composition and/or concentration depending upon the characteristics of the semiconductor light emitting device 120 and/or other parameters. The elongated hollow wavelength conversion tube 110 may be evacuated, air-filled or filled with an inert and/or reactive gas. The tube may also include a solid and/or gel therein to provide, for example, encapsulant, index matching, etc. The wavelength conversion material 114 may be uniformly or non-uniformly dispersed in the elongated wavelength conversion tube wall 112. Uniform or non-uniform composition and/or concentration may be employed.

Figure 19:
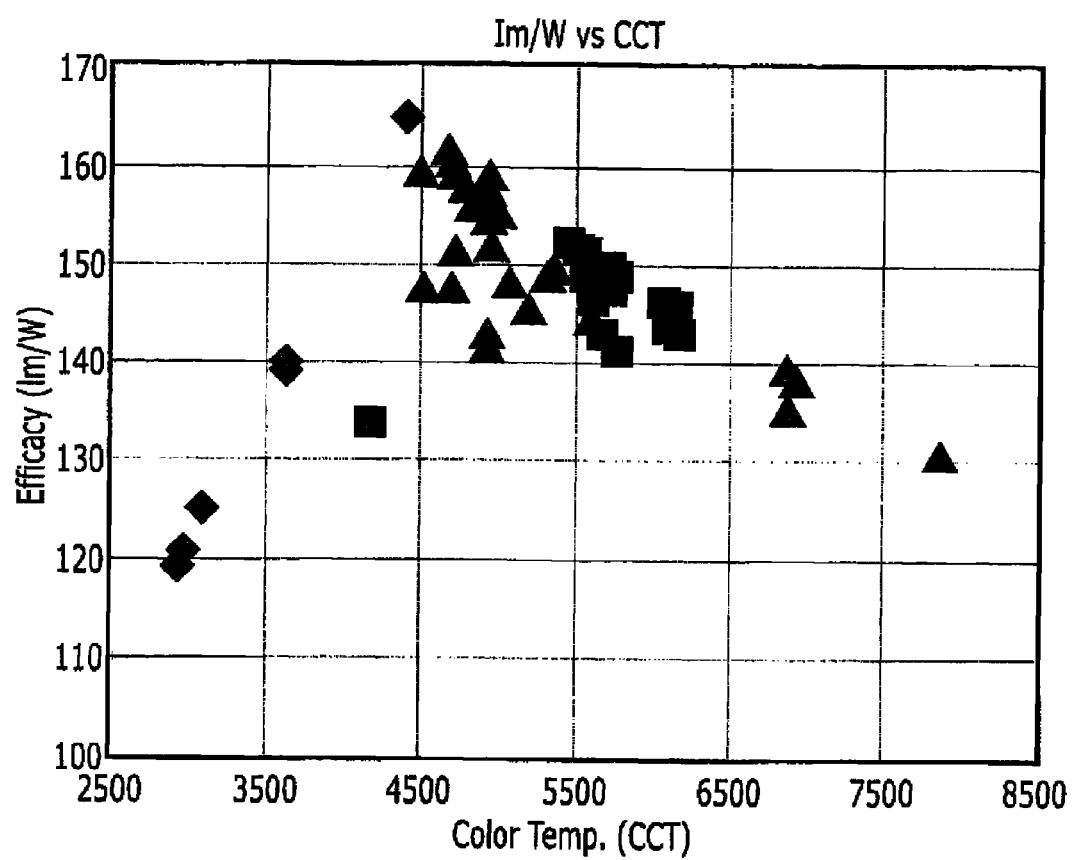
FIG. 19 graphically illustrates efficiency in lumens per watt as a function of CCT for semiconductor light emitting apparatus according to various embodiments.

Dimensionally, the elongated hollow wavelength conversion tube 110 may have a length of between about 1 mm and about 100 mm, and an inner diameter of between about 0.5 mm and about 10 mm. The tube wall 112 may have a thickness of between about 0.05 mm and about 2 mm. Wavelength conversion particles may be dispersed therein at concentrations between about 1% and about 70% by weight. The use of an elongated hollow wavelength conversion tube according to various embodiments of the invention may provide efficient white light. For example, a Cree EZ1000 LED having about a 1 $mm^2$ size and a drive current of about 350 mA at room temperature in combination with an elongated hollow wavelength conversion tube that is about 45 mm long, having an inside diameter of about 9 mm and a wall thickness of about 2 mm, and being fabricated from a sheet of flexible transparent silicone having Internatix BOSE phosphor dispersed therein at a concentration of about 30% by weight, can produce about 170 lumens of light output, about 160 lumens/watt efficiency at color temperature of about 4700K, and about 150 lumens/watt efficiency at color temperature of about 5500K. FIG. 19 graphically illustrates efficiency in lumens/watt (lm/w) vs. CCT, for these example embodiments. It will be understood that, in FIG. 19, various concentrations of phosphors may be used to obtain the desired color temperature.

Without wishing to be bound by any theory of operation, high efficiency white light production may be obtained according to various embodiments of the present invention by causing almost all of the light that is emitted by the semiconductor light emitting device 120 to strike the elongated wavelength conversion tube wall 112 at an oblique angle. More specifically, referring to FIG. 2A, a packaged light emitting diode may emit light in a Lambertian pattern 220, wherein the radiant intensity is directly proportional to the cosine of the angle between the observer's line of sight and an axis 210 that is normal to the surface of the semiconductor light emitting device 130. The Lambertian pattern 220 may be obtained by designing the light emitting device 120 to emit light in a Lambertian pattern, and designing the dome 126 so as not to change this emission pattern, or by designing the light emitting device 120 to emit light in a non-Lambertian pattern and by designing one or more optical elements in the dome 126, so that the light that emerges from the dome 126 is Lambertian. In other embodiments, as shown in FIG. 2B, a packaged or unpackaged light emitting diode may emit light in a focused (i.e., narrow far-field emission) pattern 230, wherein more radiant energy is emitted closer to the axis 210 of emission than to the sides. Again, this focused pattern may be obtained by designing the light emitting device 120 to emit light in a focused pattern and designing the dome 126 so as to not change this emission pattern or by designing the light emitting device 120 to emit light in a non-focused pattern and by designing one or more optical elements in the dome 126 so that the light emerges from the dome 126 in a focused pattern. Other conventional emission patterns may be used.

Conventionally, the dome 126 may be designed to be hemispherical so that the emitted light 122 crosses the dome perpendicular to the dome surface. Thus, if phosphor is coated on the inner and/or outer surfaces of the dome 126, much of the emitted light will be backscattered into the device 120. In sharp contrast, when the packaged LED 130 is mounted relative to an elongated hollow wavelength conversion tube as shown in FIG. 1B, at least 20% of the emitted light 122 can strike the elongated hollow wavelength conversion tube wall 112 at an oblique angle, as shown in FIG. 1B. The backscattering of light back into the semiconductor light emitting device 120 may be substantially reduced. Moreover, in some embodiments, at least about 90% of the emitted light 122 can strike the elongated hollow wavelength conversion tube wall 112 at an oblique angle, as shown in FIG. 1B. The backscattering of light back into the semiconductor light emitting device may be substantially reduced.

Accordingly, some embodiments of the present invention may allow light that is emitted from the semiconductor light emitting device 120 to pass through the dome 126 generally orthogonal thereto, but to strike the elongated hollow wavelength conversion tube wall 112 substantially oblique thereto. Thus, some embodiments of the invention may be regarded as providing a primary optical surface, such as the dome 126 of the packaged light emitting diode 130, wherein Lambertian radiation causes almost all of the emitted light to cross the surface orthogonal thereto, and the elongated wavelength conversion tube wall 112 provides a secondary optical surface including wavelength conversion material 114 dispersed therein, wherein almost all of the light impinges on the secondary optical surface 112 at an oblique angle thereto.

Without wishing to be bound by any theory of operation, high efficiency of embodiments of the present invention may also be explained due to different path lengths that may be established within the elongated hollow wavelength conversion tube 110. In particular, referring to FIGS. 3 and 3A, the emitted light 122 from the semiconductor light emitting device 120 reflects off the inner surface of the tube wall 110, as shown by ray 310, and also refracts within the tube wall, as shown by ray 312. Additional internal reflection takes place from the outer wall, as shown as by ray 314, and some of the original light 316 emerges from the tube. The path through the wall 112 is indicated by ray 312. In contrast, when light strikes a phosphor particle 114 that is embedded within the tube wall 112, it is converted and scattered in all directions, as shown by the rays 322.

Figure 3A:
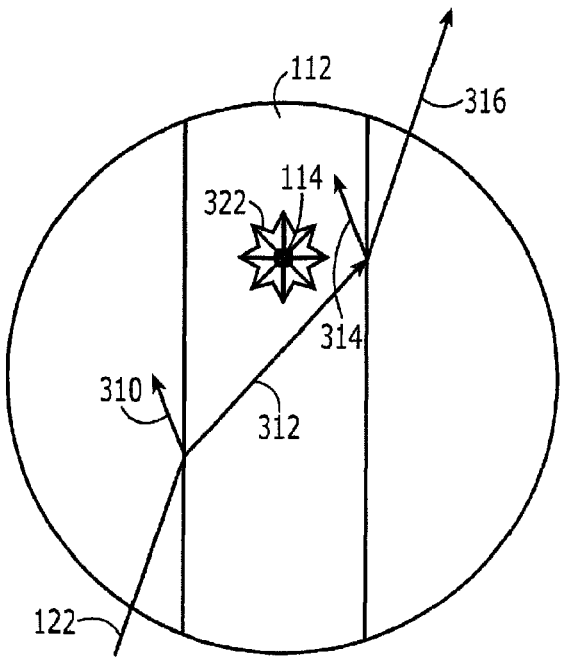

Accordingly, as shown in FIGS. 3 and 3A, except for near the semiconductor light emitting device 120, very little light is reflected back at the semiconductor light emitting device 120. In order for the light 122, such as blue light, that emerges from the semiconductor light emitting device 120 to convert, for example to yellow light, it must impinge on a wavelength conversion material (e.g., phosphor) particle 114. Once it does convert, it is desirable for the converted emission 322 to escape with minimal obstruction, not only from the LED 130 but also from other wavelength conversion material particles 114. Thus, it is desirable for the wavelength conversion material layer to appear thick for the blue light, but thin for the yellow emission 322. The tube 110 helps to achieve this, because the blue light has a longer path 312 through the tube wall 112 at grazing incidence and the same amount of conversion can be achieved with less wavelength conversion material 114. Thus, since the blue light has a longer path length 312 through the tube wall 112 at grazing incidence, the tube appears thicker for the incoming blue light. Since the tube appears thicker, a lower concentration of phosphor may be used. By using a lower concentration of phosphor, less phosphor obstruction may be provided. Accordingly, in some embodiments, the elongated hollow wavelength conversion tube 110 is oriented relative to the semiconductor light emitting device 120, so as to provide a longer path length 312 through the elongated wavelength conversion tube wall 112 for light 122 that is emitted by the semiconductor light emitting device 120 that does not strike the wavelength conversion material 114 embedded therein, without increasing the path length of light 322 that is converted by the wavelength conversion material 114 embedded therein.

Figure 4:
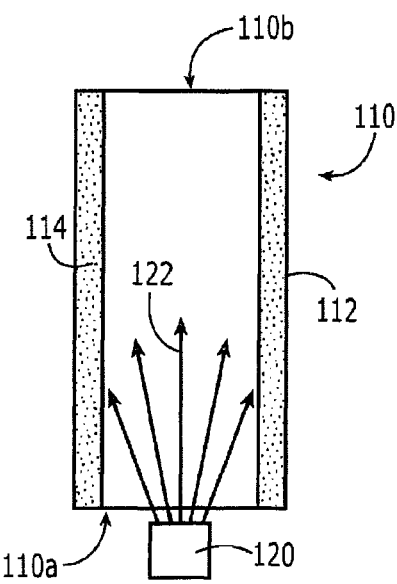

Various configurations of elongated hollow wavelength conversion tubes may be provided according to various embodiments of the present invention. For example, as shown in FIG. 4, the elongated hollow wavelength conversion tube 110 includes first and second opposing ends 110a, 110b, and the semiconductor light emitting device 120 is adjacent the first end 110a. It will also be understood that in FIG. 4 and other figures to follow, the semiconductor light emitting device 120 is shown outside the elongated hollow wavelength conversion tube 110. In these embodiments, a reflector, lens and/or other optical element may be provided to direct the light 122 inside the tube 110. However, in other embodiments, the semiconductor light emitting device 120 may extend at least partially into the elongated hollow wavelength conversion tube 110. In yet other embodiments, the semiconductor light emitting device 120 extends fully into the elongated hollow wavelength conversion tube 110.

Figure 5:
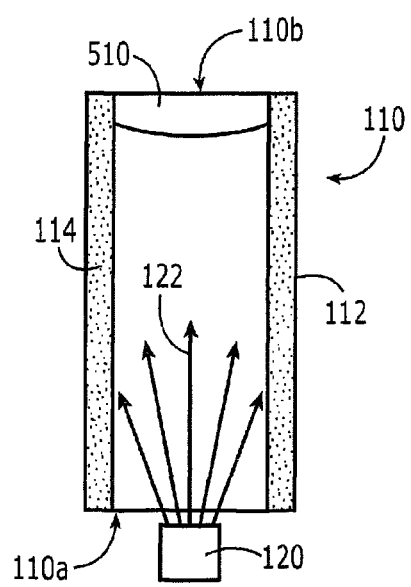
Figure 6:
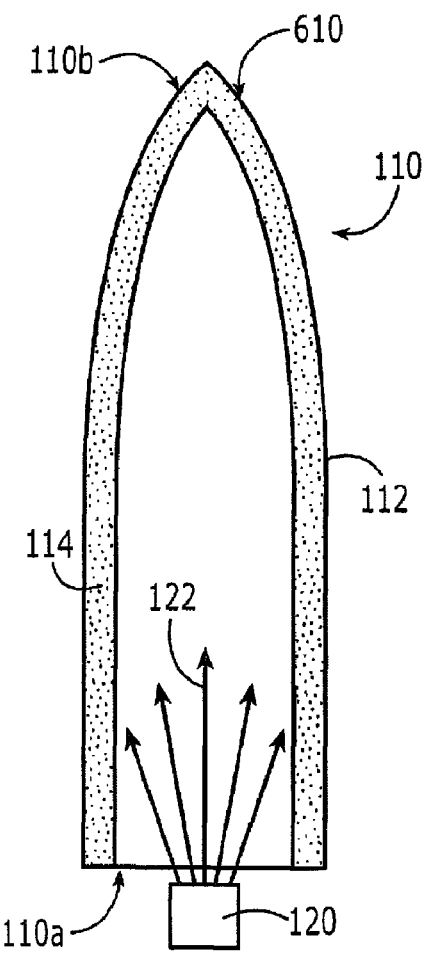

In FIG. 4, the second end 110b is an open end. In contrast, in FIG. 5, the second end 110b is a closed second end, which may be provided by a cap 510. The cap 510 may be reflective and/or may contain wavelength conversion material therein. The cap 510 may be planar or non-planar as illustrated. For example, a hemispherical, prismatic, textured and/or micro-lens-covered cap may be provided. The wavelength conversion material in the cap 510 may be same as, or different from the wavelength conversion material 114 in the elongated wavelength conversion tube wall 112 in terms of composition and/or concentration. In other embodiments, as shown in FIG. 6, the second end 110b is a crimped second end 610. It will be understood that the word "crimped" is used herein to denote a tapered end, and not to denote any particular manufacturing method. Thus, FIG. 6 illustrates embodiments of bullet-shaped elongated hollow wavelength tubes 110.

Figure 7:
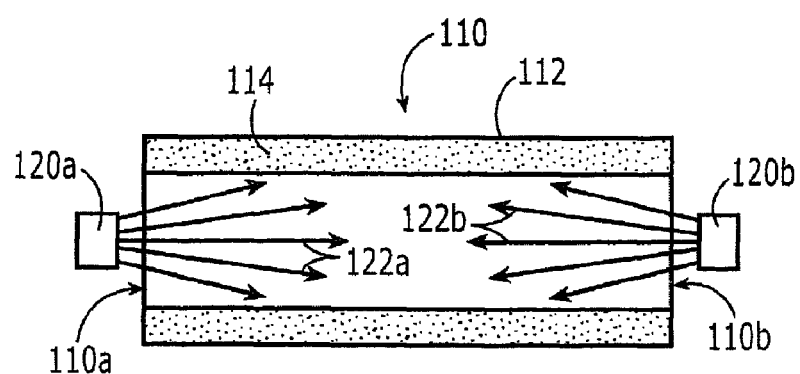

Embodiments of the invention that have been described above employ one or more semiconductor light emitting devices 120 at a first end 110a of the elongated hollow wavelength conversion tube 110. However, in other embodiments, at least one semiconductor light emitting device may be provided at both ends of the tube 110. For example, as shown in FIG. 7, a first semiconductor light emitting device 120a is included adjacent the first end 110a of the elongated hollow wavelength conversion tube 110, and oriented to emit light inside the elongated hollow wavelength conversion tube 110. A second semiconductor light emitting device 120b is located adjacent the second end 110b and is oriented to emit light 122b inside the elongated hollow wavelength conversion tube.

Figure 8:
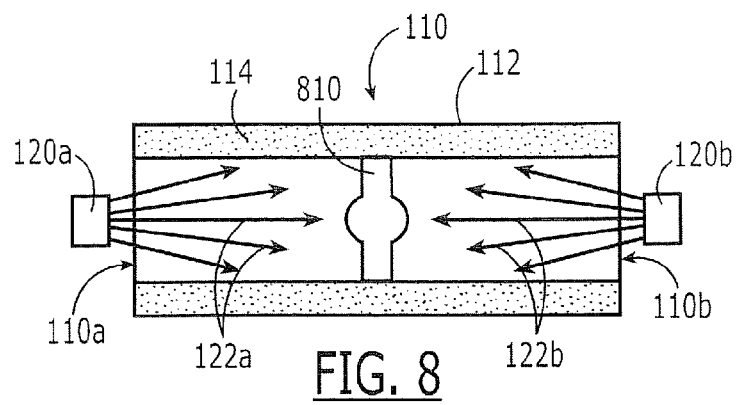
Figure 9A:
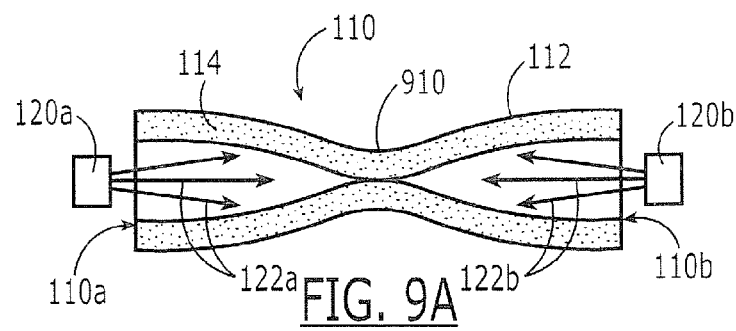
Figure 9B:
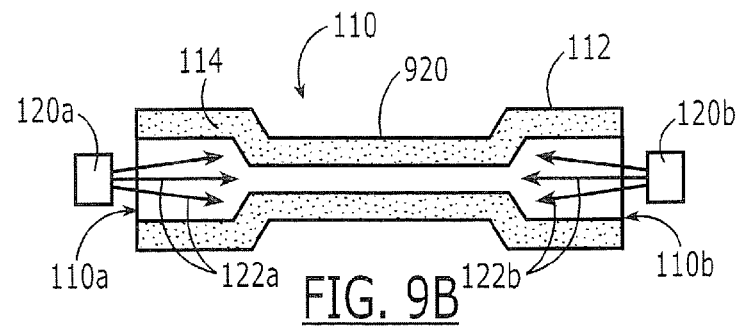

FIG. 8 illustrates other embodiments wherein a double-sided reflector 810 is included in the elongated hollow wavelength conversion tube 110 between the first and second semiconductor light emitting devices 120a, 120b. The double-sided reflector 810 may be embodied as a mirror, a ball bearing and/or other device that reflects at least some light impinging thereon. For example, a spherical, prismatic, textured and/or microlens-covered double-sided reflector may be provided. The double-sided reflector 810 may be flat or non-planar as shown. The double-sided reflector also may include wavelength conversion material. FIG. 9A illustrates other embodiments wherein the elongated hollow wavelength conversion tube 110 is crimped as shown at 910, between the first and second semiconductor light emitting devices 120a, 120b. FIG. 9A shows a gradual crimp that is fully closed, whereas FIG. 9B illustrates an abrupt crimp 920 that is not fully closed.

Figure 10:
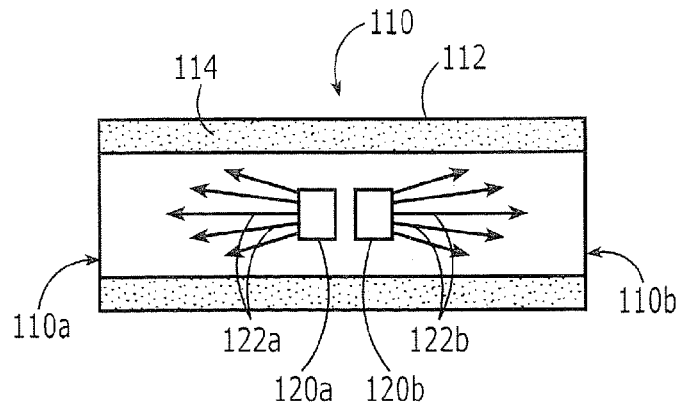

FIG. 10 illustrates other embodiments wherein the first and second semiconductor light emitting devices 120a, 120b are oriented in back-to-back relation within the elongated hollow wavelength conversion tube 110, such that the first semiconductor device 120a emits light 122a towards the first end 110a and the second semiconductor light emitting device 120b emits light 122b towards the second end 110b. In other embodiments, the first and/or second ends 110a, 110b may include a cap, such as a cap 510 of FIG. 5, may be crimped or tapered, such as by including crimp 610 of FIG. 6, or may be open as shown. Also, the two ends need not have the same type of termination.

Figure 11:
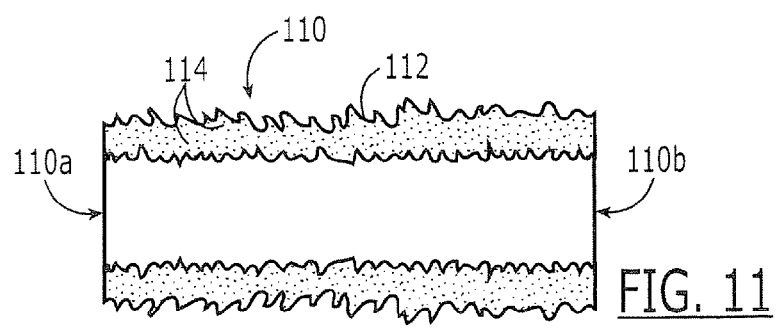
FIGS. 11A-14 are cross-sectional views of elongated hollow wavelength conversion tubes according to various embodiments.
Figure 11B:
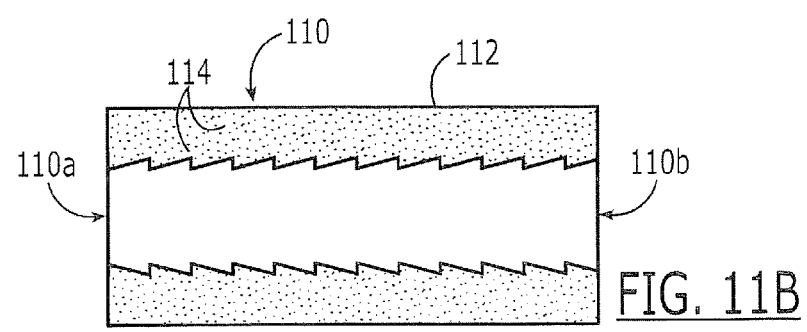

The elongated hollow wavelength conversion tube 110 itself may also have many different configurations. For example, in FIG. 11A, the elongated tube wall 112 includes inner and outer surfaces wherein the inner and/or outer surfaces are textured as shown. The texturing may be uniform and/or non-uniform. Texturing may enhance scattering of light. Moreover, FIG. 11B illustrates other embodiments wherein a sawtooth pattern or other pattern may be used to guide the unconverted light, so as to further increase its path length in the wavelength conversion tube. Other light guiding patterns may also be used.

Figure 12:
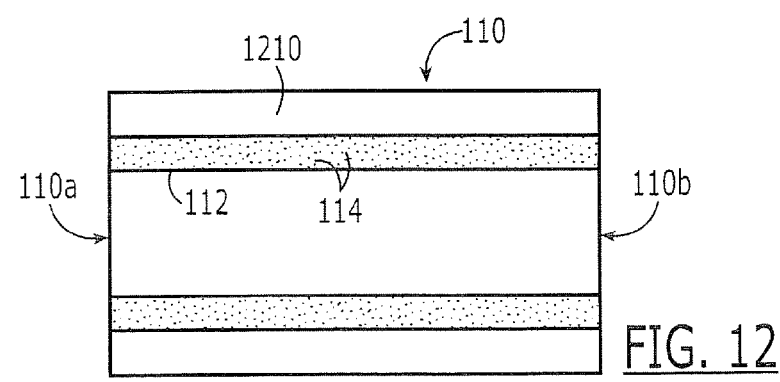
Figure 13:
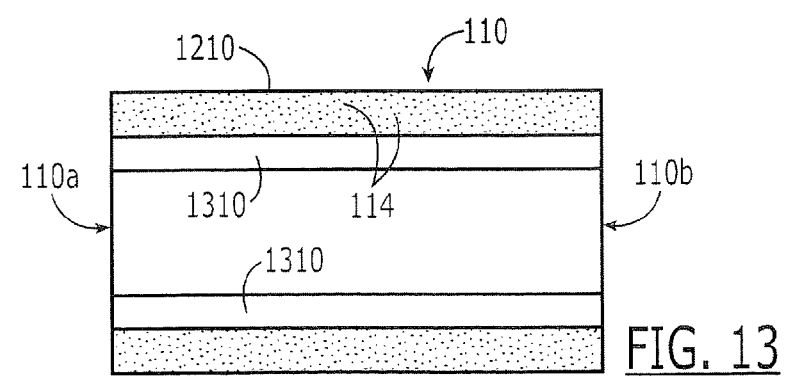

In other embodiments, as shown in FIGS. 12 and 13, a supporting layer may be provided to support the elongated wavelength conversion tube wall 112. In FIG. 12, the supporting layer 1210 is on the outer surface of the elongated hollow wavelength conversion tube wall 112, whereas in FIG. 13, the supporting layer is on the inner surface of the elongated hollow wavelength conversion tube wall 112. In fact, embodiments of FIGS. 12 and 13 may be fabricated by coating a wavelength conversion material 114 inside or outside a supporting tube 1210, 1310, respectively, so that the elongated hollow wavelength conversion tube 110 may actually be embodied as a coating on a supporting material. In still other embodiments, a supporting layer may be provided on both the inside and outside surfaces of the elongated wavelength conversion tube wall 112.

Figure 14:
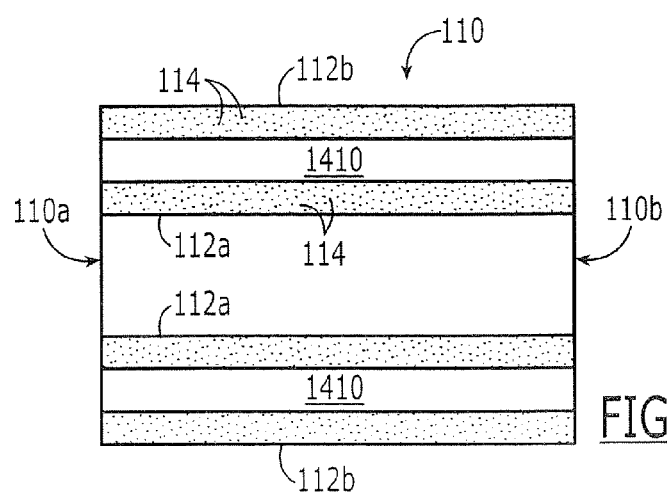

Multiple concentric elongated hollow conversion tubes 112 also may be provided according to other embodiments. In particular, as shown in FIG. 14, a first elongated hollow wavelength conversion tube 112a and a second elongated hollow wavelength conversion tube 112b are provided coaxial to one another. The tubes may be spaced apart and may be supported by a common supporting layer 1410. In fact, embodiments of FIG. 14 may be fabricated by coating inner and outer surfaces of a supporting layer 1410 with wavelength conversion material 114. In embodiments of FIG. 14, the wavelength conversion material 114 dispersed in the first and second elongated wavelength conversion tube walls 112a, 112b may be the same or may be different in composition and/or concentration.

Figure 15:
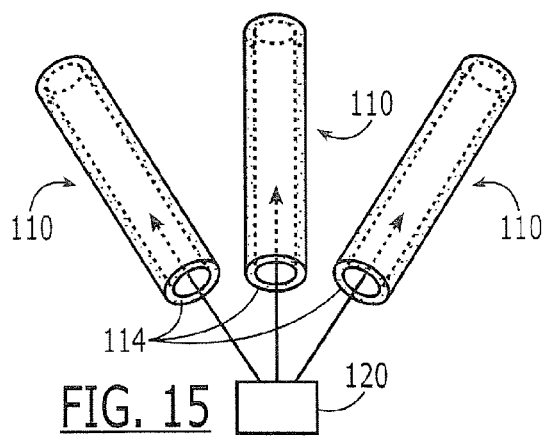
FIGS. 15-18 are cross-sectional views of semiconductor light emitting apparatus according to still other embodiments.
Figure 16:
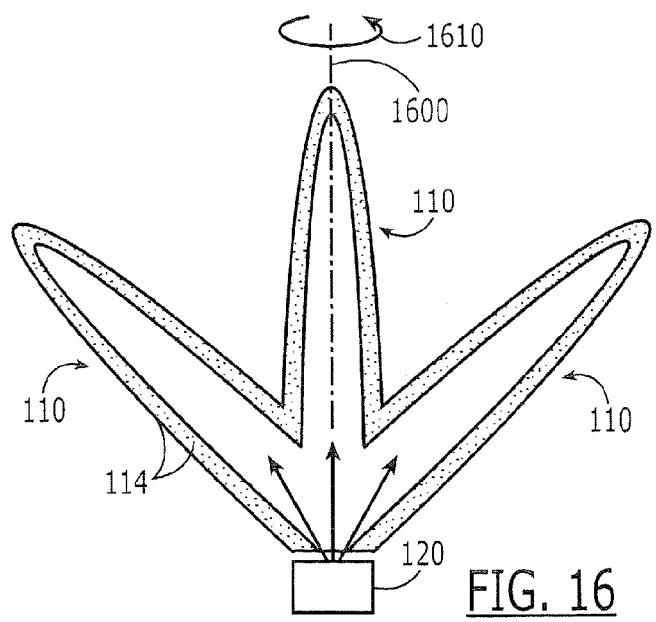

FIG. 15 illustrates other embodiments wherein a plurality of elongated hollow wavelength conversion tubes 110 are provided for a semiconductor light emitting device 120 or a cluster of semiconductor light emitting devices 120. Thus, a semiconductor light emitting device 120, or a cluster of semiconductor light emitting devices 120, is adjacent a first end of each of the tubes. In FIG. 16, the elongated hollow wavelength conversion tubes 110 extend about a common origin, and the semiconductor light emitting device 120 is adjacent the common origin. In some embodiments, FIG. 16 may be regarded as a cross-sectional view showing a plurality of hollow wavelength conversion tubes 110 that surround a common origin and extend within the plane of the figure to provide a two-dimensional array. FIG. 16 may also be regarded as illustrating a cross-section of a three-dimensional array of hollow elongated tubes 110 that extend around a common axis 1600, as shown by arrow 1610. Thus, flower petal-like designs may be provided for semiconductor light emitting apparatus according to these embodiments.

Figure 17:
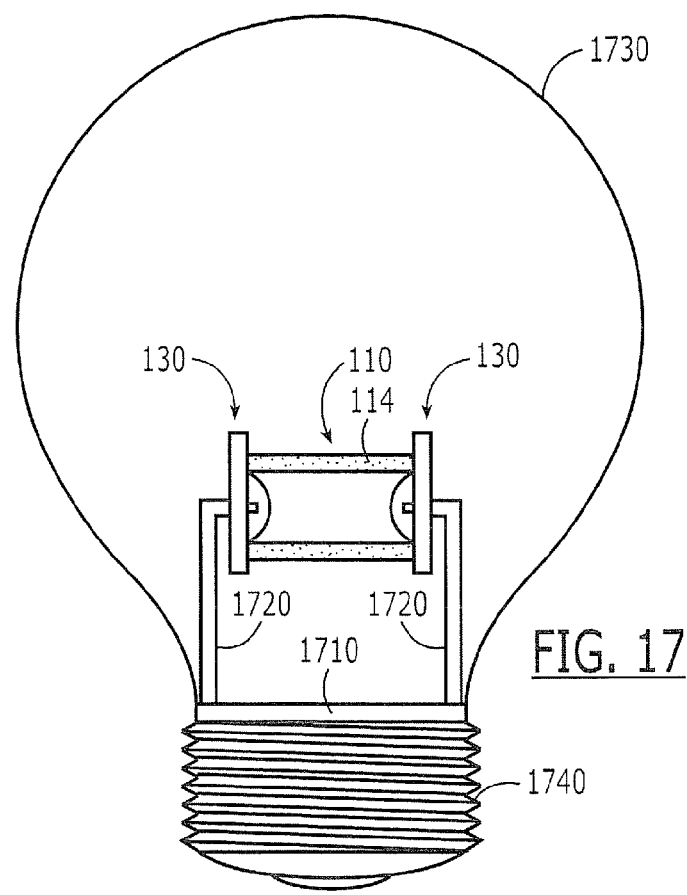

Various embodiments of the invention as described above may also be regarded as providing a semiconductor light emitting filament that may be analogized to the filament of a conventional incandescent lamp or to a miniature fluorescent bulb. Thus, as shown in FIG. 17, an elongated hollow wavelength conversion tube 110 includes a packaged semiconductor light emitting device 130 at either end. The packaged semiconductor devices 130 may be mounted on a base 1710 using heat conductive standoffs 1720 and/or other conventional mounting techniques. A bulb 1730 and a screw-type base 1740 may be provided, so that the combination of the elongated hollow wavelength conversion tube 110 and the packaged semiconductor light emitting devices 130 at opposite ends thereof provides a filament for a drop-in replacement for an incandescent bulb. It will be understood that FIG. 17 provides a simplified representation and that a drop-in replacement for an incandescent bulb may also employ voltage conversion circuits, thermal management systems, etc.

Figure 18:
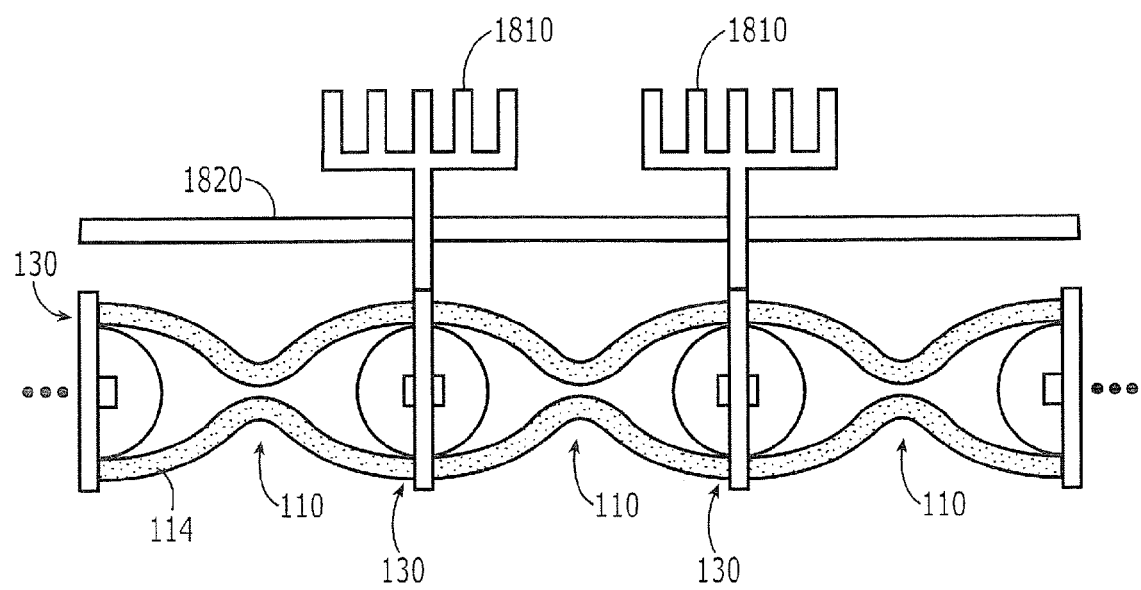

In other embodiments, as shown in FIG. 18, the filaments are oriented end-to-end in a linear array. Heat sinks 1810 and/or a reflector 1820 may also be provided.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination. For example, any of the embodiments illustrated herein may include a bare semiconductor light emitting device die or a packaged semiconductor LED; an open-ended, capped or crimped end; one or more bare or packaged semiconductor light emitting devices that are entirely outside, partially inside or fully inside the elongated hollow wavelength conversion tube; one or more supporting layers; one or more elongated hollow wavelength conversion tubes arranged concentrically or in a two- or three-dimensional array and/or packaged to include heat sinks, reflectors, driving circuitry and/or other components.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A semiconductor light emitting apparatus comprising:
an elongated hollow wavelength conversion tube that comprises an elongated wavelength conversion tube wall having wavelength conversion material dispersed therein; and
a packaged semiconductor light emitting device comprising a mounting substrate, a dome directly on the mounting substrate and a semiconductor light emitting die that is located between the mounting substrate and the dome, the packaged semiconductor light emitting device being oriented such that the dome extends into an end of the elongated hollow wavelength conversion tube, a base of the dome extends adjacent an end of the elongated wavelength conversion tube wall, the mounting substrate provides an end cap for the end of the elongated wavelength conversion tube wall and is wider than the end of the elongated hollow wavelength conversion tube to extend outside the elongated hollow wavelength conversion tube, and the semiconductor light emitting die is oriented to emit light through the dome to inside the elongated hollow wavelength conversion tube to impinge upon the elongated wavelength conversion tube wall and the wavelength conversion material dispersed therein.

2. An apparatus according to claim 1 wherein the packaged semiconductor light emitting device is oriented such that at least about 20% of the emitted light strikes the elongated wavelength conversion tube wall at an oblique angle.

3. An apparatus according to claim 1 wherein the packaged semiconductor light emitting device is oriented such that at least about 90% of the emitted light strikes the elongated wavelength conversion tube wall at an oblique angle.

4. An apparatus according to claim 1 wherein the packaged semiconductor light emitting device is a blue light emitting diode having an area of about 1 mm$^2$ and wherein the semiconductor light emitting apparatus produces about 160 lumens per watt at a color temperature of about 4700K.

5. An apparatus according to claim 1 wherein the packaged semiconductor light emitting device is a blue light emitting diode having an area of about 1 mm$^2$ and wherein the semiconductor light emitting apparatus produces about 150 lumens per watt at a color temperature of about 5500K.

6. An apparatus according to claim 1 wherein the elongated hollow wavelength conversion tube is oriented relative to the packaged semiconductor light emitting device so as to provide a longer path length through the elongated wavelength conversion tube wall for light that is emitted by the packaged semiconductor light emitting device that does not strike the wavelength conversion material embedded therein without increasing the path length of light that is converted by striking the wavelength conversion material embedded therein.

7. An apparatus according to claim 1 wherein the elongated wavelength conversion tube wall defines a tube axis, wherein the packaged semiconductor light emitting device is configured to emit light symmetrically about an emission axis and wherein the packaged semiconductor light emitting device is oriented such that the emission axis is coincident with the tube axis.

8. An apparatus according to claim 1 wherein the elongated hollow wavelength conversion tube includes first and second opposing ends, and the packaged semiconductor light emitting device is adjacent the first end.

9. An apparatus according to claim 8 wherein the second end is a closed second end.

10. An apparatus according to claim 9 wherein the second end is a crimped second end.

11. An apparatus according to claim 9 further comprising a cap at the second end.

12. An apparatus according to claim 11 wherein the cap comprises wavelength conversion material.

13. An apparatus according to claim 11 wherein the cap comprises reflective material.

14. An apparatus according to claim 8 wherein the packaged semiconductor light emitting device is a first packaged semiconductor light emitting device, the apparatus further comprising a second packaged semiconductor light emitting device adjacent the second end that is oriented to emit light inside the elongated hollow wavelength conversion tube to impinge upon the elongated wavelength conversion tube wall and the wavelength conversion material dispersed therein.

15. An apparatus according to claim 14 further comprising a double-sided reflector in the elongated hollow wavelength conversion tube between the first and second packaged semiconductor light emitting devices.

16. An apparatus according to claim 14 wherein the elongated hollow wavelength conversion tube is crimped between the first and second packaged semiconductor light emitting devices.

17. An apparatus according to claim 8 wherein the packaged semiconductor light emitting device is a first packaged semiconductor light emitting device, the apparatus further comprising a second packaged semiconductor light emitting device that extends at least partially into the elongated hollow wavelength conversion tube to emit light towards the second end.

18. An apparatus according to claim 1 wherein the elongated hollow wavelength conversion tube is a first elongated hollow wavelength conversion tube, the apparatus further comprising a second elongated hollow wavelength conversion tube, wherein the first and second elongated hollow wavelength conversion tubes share a common end and wherein the packaged semiconductor light emitting device is adjacent the common end and is oriented to emit light inside the first and second elongated hollow wavelength conversion tubes.

19. An apparatus according to claim 1 wherein the elongated hollow wavelength conversion tube wall includes inner and outer surfaces and wherein the elongated hollow wavelength conversion tube further comprises a supporting layer on the inner surface and/or on the outer surface.

20. An apparatus according to claim 1 wherein the elongated hollow wavelength conversion tube is a first elongated hollow wavelength conversion tube, the apparatus further comprising:
a second elongated hollow wavelength conversion tube that comprises a second elongated wavelength conversion tube wall having wavelength conversion material dispersed therein, the first and second elongated hollow wavelength conversion tubes being coaxial to one another.

21. An apparatus according to claim 1 wherein the elongated tube wall includes inner and outer surfaces and wherein the inner and/or outer surfaces are textured.

22. An apparatus according to claim 21 wherein the inner and/or outer surfaces are non-uniformly textured.

23. An apparatus according to claim 1 wherein the elongated wavelength conversion tube wall has wavelength conversion material non-uniformly dispersed therein.

24. An apparatus according to claim 17 further comprising:
a screw-type base;
a pair of standoffs that maintain the elongated hollow wavelength conversion tube and the first and second packaged semiconductor light emitting devices spaced apart from the base; and
a bulb that is connected to the screw-type base and surrounds the hollow wavelength conversion tube and the first and second semiconductor light emitting devices.

25. An apparatus according to claim 18 further comprising a plurality of elongated hollow wavelength conversion tubes that share the common end and extend around a central axis.

26. An apparatus according to claim 1 wherein the elongated hollow wavelength conversion tube and the packaged semiconductor light emitting device define a light emitting filament, the apparatus further comprising:
at least one additional light emitting filament, each of the at least one additional light emitting filaments comprising an additional elongated hollow wavelength conversion tube that includes an additional elongated wavelength conversion tube wall having wavelength conversion material dispersed therein and an additional packaged semiconductor light emitting device that is oriented to emit light inside the elongated hollow wavelength conversion tube to impinge upon the elongated wavelength conversion tube wall and the wavelength conversion material dispersed therein.

27. An apparatus according to claim 26 wherein the light emitting filament and the at least one additional light emitting filament are oriented end-to-end in a linear array.

28. An apparatus according to claim 26 wherein the light emitting filament and the at least one additional light emitting filament extend about a common origin in a three-dimensional array.

29. A method of assembling a semiconductor light emitting apparatus comprising:
inserting a dome that surrounds a semiconductor light emitting device and that is directly on a substrate at least partially into an end of an elongated hollow wavelength conversion tube that comprises an elongated wavelength conversion tube wall having wavelength conversion material dispersed therein, such that a base of the dome extends adjacent an end of the elongated wavelength conversion tube wall, the mounting substrate provides an end cap for the end of the elongated wavelength conversion tube wall and is wider than the end of the elongated hollow wavelength conversion tube to extend outside the elongated hollow wavelength conversion tube, and the semiconductor light emitting die is oriented to emit light through the dome to inside the elongated hollow wavelength conversion tube to impinge upon the elongated wavelength conversion tube wall and the wavelength conversion material dispersed therein.

30. A method according to claim 29 further comprising crimping the elongated hollow wavelength conversion tube remote from the end.

31. An apparatus according to claim 1 wherein the elongated wavelength conversion tube wall is of approximately same diameter as the base of the dome and the end of the elongated wavelength conversion tub wall is directly on the mounting substrate.

* * * * *